(12) United States Patent
Davey et al.

(10) Patent No.: US 11,258,695 B2
(45) Date of Patent: Feb. 22, 2022

(54) MODIFIED GRACEFUL RESTART

(71) Applicant: Metaswitch Networks Ltd., Enfield (GB)

(72) Inventors: Alan Davey, Enfield (GB); Jonathan Cumming, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 63 days.

(21) Appl. No.: 16/803,679

(22) Filed: Feb. 27, 2020

(65) Prior Publication Data
US 2020/0280508 A1 Sep. 3, 2020

(30) Foreign Application Priority Data
Feb. 28, 2019 (GB) ...................................... 1902728

(51) Int. Cl.
*H04L 12/751* (2013.01)
*H04L 45/02* (2022.01)
(Continued)

(52) U.S. Cl.
CPC .............. *H04L 45/02* (2013.01); *H04L 45/12* (2013.01); *H04L 47/24* (2013.01)

(58) Field of Classification Search
CPC ........ H04L 45/02; H04L 45/12; H04L 45/22; H04L 47/24; H04L 45/28; H04L 41/0654
See application file for complete search history.

(56) References Cited

U.S. PATENT DOCUMENTS

| | | | |
|---|---|---|---|
| 8,953,437 B1 * | 2/2015 | Tiruveedhula | H04L 45/50 370/218 |
| 2007/0253434 A1 * | 11/2007 | Oswal | H04L 45/28 370/401 |

(Continued)

OTHER PUBLICATIONS

"Hounkonnou et al. ""Enhanced OSPF Graceful Restart"", published 2013,IEEE, 2013 IFIP/IEEE International Symposium on Integrated NetworkManagement (IM 2013): Mini-Conference, pp. 657-663. Availablefrom https://ieeexplore.ieee.org/document/6573047".

(Continued)

*Primary Examiner* — Pao Sinkantarakorn
*Assistant Examiner* — Kabir U Jahangir
(74) *Attorney, Agent, or Firm* — Han Gim; Newport IP, LLC

(57) ABSTRACT

A network node has a graceful restart mode in which the node: sends a graceful restart notification to one or more neighbouring nodes; attempts to re-establish an adjacency with the neighbouring node(s); receives link state data from at least one of the neighbouring node(s), the received data being sent in response to said attempt; derives pre-restart link data from the received data, the derived data identifying formerly active links, including the node, for routing traffic before the restart; routes network traffic in accordance with routing information stored in the router; detects one or more links, of the formerly active links, which are currently inactive; continues with graceful restart after said detection; determines one or more links, of the formerly active links, which are currently active; and exits the graceful restart mode in response to successful re-establishment of adjacencies with a respective neighbouring node for each of the currently active link(s).

20 Claims, 8 Drawing Sheets

(51) Int. Cl.
*H04L 45/12* (2022.01)
*H04L 47/24* (2022.01)

(56) References Cited

U.S. PATENT DOCUMENTS

2012/0275456 A1* 11/2012 Ammireddy ............ H04L 45/02
370/390
2016/0269293 A1* 9/2016 K A ........................ H04L 45/02

OTHER PUBLICATIONS

Moy et al., "RFC 3623: Graceful OSPF Restart", 2003, IETF.
Moy et al., RFC 2328 (OSPFv2) Standards Track Protocol: Apr. 1998.
Coltun et al.: "RFC 5340 (OSPF for IPv6)" Jul. 2008.
Pillay Esnault et al.: "RFC 5187 (OSPFv3 Graceful Restart)" Jun. 2008.

* cited by examiner

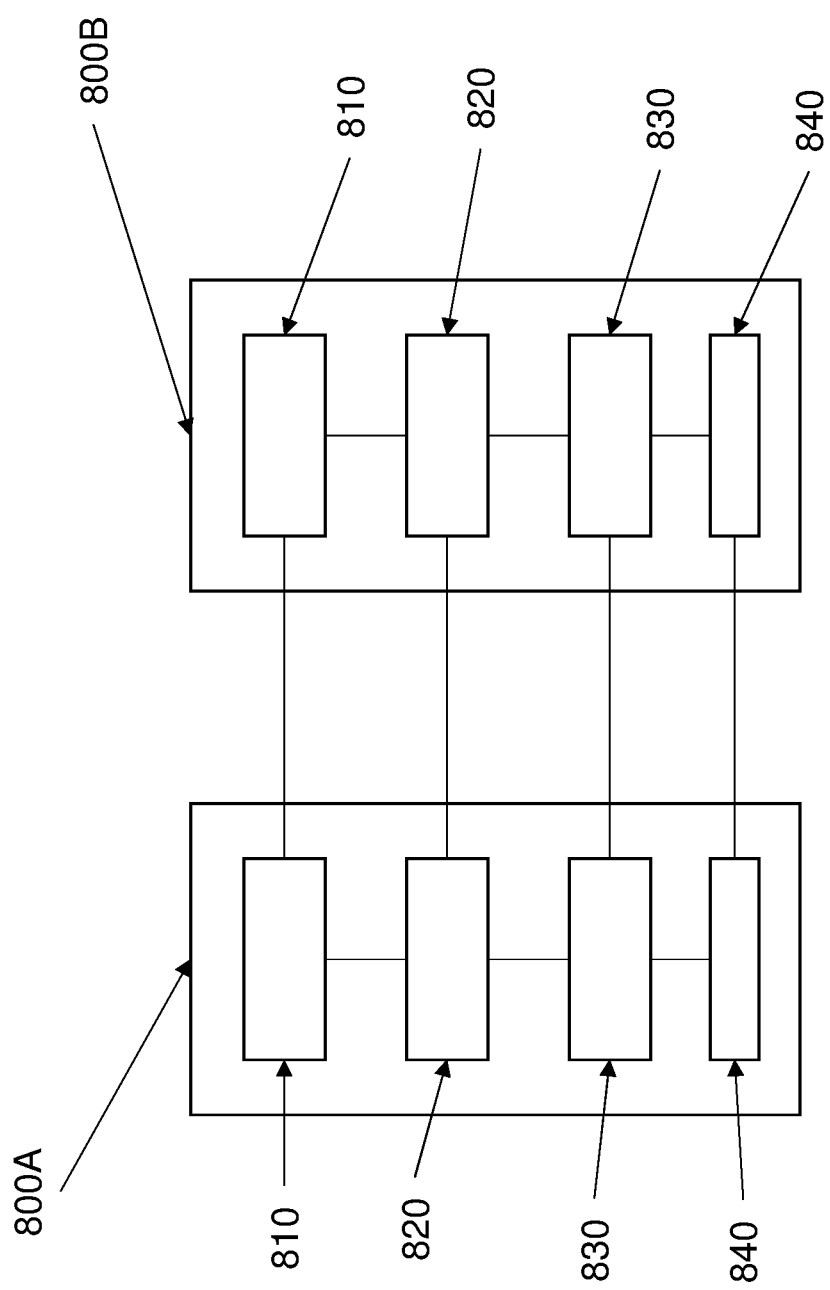

MODIFIED GRACEFUL RESTART

CROSS-REFERENCE TO RELATED APPLICATIONS

This application claims priority to GB Application No. GB 1902728.3, filed Feb. 28, 2019, under 35 U.S.C. § 119(a). The above-referenced patent application is incorporated by reference in its entirety.

BACKGROUND OF THE INVENTION

Field of the Invention

The present invention relates to packet routing, and in particular to a router having a graceful restart capability.

Description of the Related Technology

In internet protocol based networks, the routing of packets is commonly performed using the Open Shortest Path First routing protocol. OSPF calculates the shortest route to a destination based on the 'cost' of the route, with the 'cost' being determined in accordance with the available bandwidth, network load and delay. Each OSPF router stores a link state database, which is used to determine the cost of a route. An OSPF router will send link state advertisements (LSAs) to neighbouring routers and thus the route costs will propagate through the network as each OSPF router sends LSAs, such that each OSPF router will continuously update their link state databases with information about the network topology and use the information held in the link state databases to re-calculate their forwarding tables.

An enhancement of OSPF is the "graceful restart" mode (see IETF RFC3623 and RFC5187). Under conventional OSPF operation, if a router were to restart then OSPF will re-route traffic around the re-starting router. This re-routing reduces the risk that traffic is lost in black holes or that routing loops are formed due to the link state database of the restarting router being out of synchronisation. However, if the restarting router has retained its forwarding tables and the network topology is unchanged then it is possible for the restarting router to continue to forward traffic.

If an OSPF router attempts a graceful restart then it will transmit grace-LSAs to its neighbouring nodes, which announces the intention to perform a graceful restart. The grace-LSA contains a time-out value, or grace time-out period, within which the graceful restart is to be performed. The neighbouring nodes will acknowledge receipt of the grace-LSAs and enter a 'helper mode'. Whilst in helper mode, the neighbouring nodes will continue to act as though the restarting router is operating normally. The restarting router will continue to forward traffic using the forwarding tables held before the restart. The restarting router will restart OSPF and then seek to re-establish adjacencies with the neighbouring nodes. Once adjacencies have been re-established then the router can exit graceful restart and return to normal operation. It will flush the grace-LSA, causing the neighbouring nodes to exit helper mode, re-commence sending LSAs to the neighbouring nodes and will regenerate its routing tables.

If the restarting router receives an LSA which is inconsistent with a pre-restart LSA, for example an LSA which does not comprise a link which was previously present, then the restarting router will exit graceful restart and will return to normal operation, as described above.

SUMMARY

According to a first aspect of the present invention, there is provided a network node for use in a communications network, the network node having a graceful restart mode, wherein in the graceful restart mode the network node is arranged to perform the steps of: sending a graceful restart notification to one or more neighbouring nodes; attempting to re-establish an adjacency with each of the one or more neighbouring nodes; receiving link state data from at least one of the one or more neighbouring nodes, the link state data being sent in response to the attempt to re-establish an adjacency, deriving pre-restart link data from the received link state data, the pre-restart link state data identifying a plurality of formerly active links for routing traffic before the restart, the formerly active links including the network node; routing network traffic in accordance with routing information stored in the router; detecting one or more links, of the formerly active links, which are currently inactive; continuing with graceful restart after the detection of one or more links, of the formerly active links, which are currently inactive; determining one or more links, of the formerly active links, which are currently active; and exiting the graceful restart mode in response to successful re-establishment of adjacencies with a respective neighbouring node for each of the one or more links which are currently active.

The network node may be arranged to directly detect one or more of said currently inactive links, without receiving link state update data from one or more neighbouring nodes relating to said currently inactive links. Alternatively, the network node may be arranged to indirectly detect one or more of said currently inactive links, by receiving link state update data from one or more neighbouring nodes relating to said currently inactive links. The network node may be arranged to exit the graceful restart mode if the adjacencies with the respective neighbouring nodes for each of the one or more links which are currently active are not re-established within a predetermined time-out period.

The network node may be arranged to detect one or more high priority links of the formerly active links, which are currently inactive; and exit the graceful restart mode in response to the detection of the one or more high priority links, of the formerly active links, which are currently inactive. The one or more high priority links may be classified as high priority in accordance with the traffic carried by the one or more links before the restart. In particular, the one or more high priority links may be classified as high priority if the traffic carried by the links before the restart exceeds a pre-determined threshold value.

The network node may be arranged to exit the graceful restart mode in response to the detection of one or more links, of the formerly active links, which are currently inactive, the decision to exit the graceful restart mode being made in accordance with the number of currently inactive links. The decision to exit the graceful restart mode may be made in accordance with the traffic carried by the currently inactive links before the restart.

A node according to the present invention may be used to improve the operational performance of the network in which it is installed. In contrast to conventional graceful restart procedures, a node according to the present invention can continue with, and successfully exit graceful restart without timing out, despite loss of links.

The network node may have a first graceful restart mode and a second graceful restart mode, wherein: the network node is configurable to perform graceful restart according to the first graceful restart mode or the second graceful restart mode; the network node, when configured in the first graceful restart mode, is configured to perform the steps as previously described; and the network node, when configured in the second graceful restart mode, is configured to perform the steps of: attempting to re-establish an adjacency with each of one or more neighbouring nodes; receiving pre-restart link state data from at least one of the one or more neighbouring nodes, the pre-restart link state data being sent in response to the attempt to re-establish an adjacency, the pre-restart link state data identifying a plurality of formerly active links via which traffic was routed before the restart, the formerly active links including the network node; storing routing information based upon the received pre-restart link state data; routing network traffic in accordance with the routing information; detecting one or more links, of the formerly active links, which are currently inactive; and exiting the graceful restart mode in response to the detection of one or more links, of the formerly active links, which are currently inactive.

According to a second aspect of the present invention, there is provided a communications network comprising a plurality of network nodes, the plurality of network nodes being connected by a plurality of links, wherein one or more of the network nodes comprise a network node as described above.

According to a third aspect of the present invention, there is provided a method of operating a network node, the network node having a graceful restart mode, wherein in the graceful restart mode the network node is arranged to: send a graceful restart notification to one or more neighbouring nodes; attempt to re-establish an adjacency with each of the one or more neighbouring nodes; receive link state data from at least one of the one or more neighbouring nodes, the link state data being sent in response to the attempt to re-establish an adjacency, derive pre-restart link data from the received link state data, the pre-restart link state data identifying a plurality of formerly active links for routing traffic before the restart, the formerly active links including the network node; route network traffic in accordance with routing information stored in the router; detect one or more links, of the formerly active links, which are currently inactive; continue with graceful restart after the detection of one or more links, of the formerly active links, which are currently inactive; determine one or more links, of the formerly active links, which are currently active; and exit the graceful restart mode in response to successful re-establishment of adjacencies with a respective neighbouring node for each of the one or more links which are currently active.

The one or more of said currently inactive links may be detected directly, without receiving link state update data from one or more neighbouring nodes relating to said currently inactive links, or indirectly, by receiving link state update data from one or more neighbouring nodes relating to said currently inactive links. The network node may be arranged to exit the graceful restart mode if the adjacencies with each of the respective neighbouring nodes for the one or more links which are currently active are not re-established within a predetermined time-out period.

The network node may be arranged to detect one or more high priority links of the formerly active links, which are currently inactive; and exit the graceful restart mode in response to the detection of the one or more high priority links, of the formerly active links, which are currently inactive. The one or more high priority links may be classified as high priority in accordance with the traffic carried by the one or more links before the restart. In particular, the one or more high priority links may be classified as high priority if the traffic carried by the links before the restart exceeds a pre-determined threshold value.

The network node may be arranged to exit the graceful restart mode in response to the detection of one or more links, of the formerly active links, which are currently inactive, the decision to exit the graceful restart mode being made in accordance with the number of currently inactive links. The decision to exit the graceful restart mode may be made in accordance with the traffic carried by the currently inactive links before the restart.

In a variant of the method, the network node may have a first graceful restart mode and a second graceful restart mode, wherein: the network node is configurable to perform graceful restart according to the first graceful restart mode or the second graceful restart mode; the network node, when configured in the first graceful restart mode, is configured to perform the method as described above; and the network node, when configured in the second graceful restart mode, is configured to: attempt to re-establish an adjacency with each of the one or more neighbouring nodes; receive pre-restart link state data from at least one of the one or more neighbouring nodes, the pre-restart link state data being sent in response to the attempt to re-establish an adjacency, the pre-restart link state data identifying a plurality of formerly active links via which traffic was routed before the restart, the formerly active links including the network node; store routing information based upon the received pre-restart link state data; route network traffic in accordance with the routing information; detect one or more links, of the formerly active links, which are currently inactive; and exit the graceful restart mode in response to the detection of one or more links, of the formerly active links, which are currently inactive.

According to a fourth aspect of the present invention, there is provided a data carrier device comprising computer executable code for performing a method as described above.

Further features and advantages of the invention will become apparent from the following description of preferred embodiments of the invention, given by way of example only, which is made with reference to the accompanying drawings.

and

Figure 6:
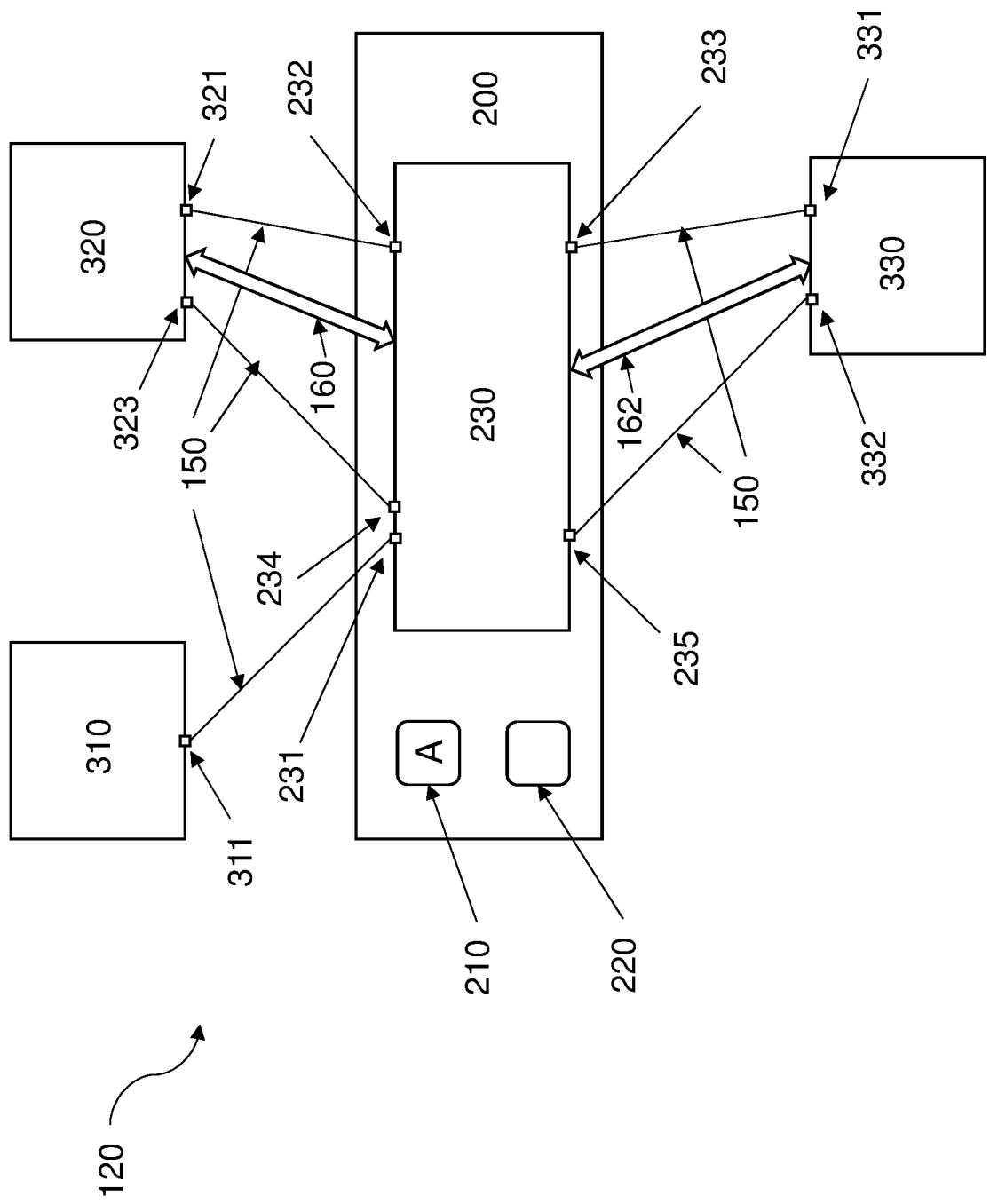
FIG. 6 shows a schematic depiction of a yet further communications network.
Figure 7:
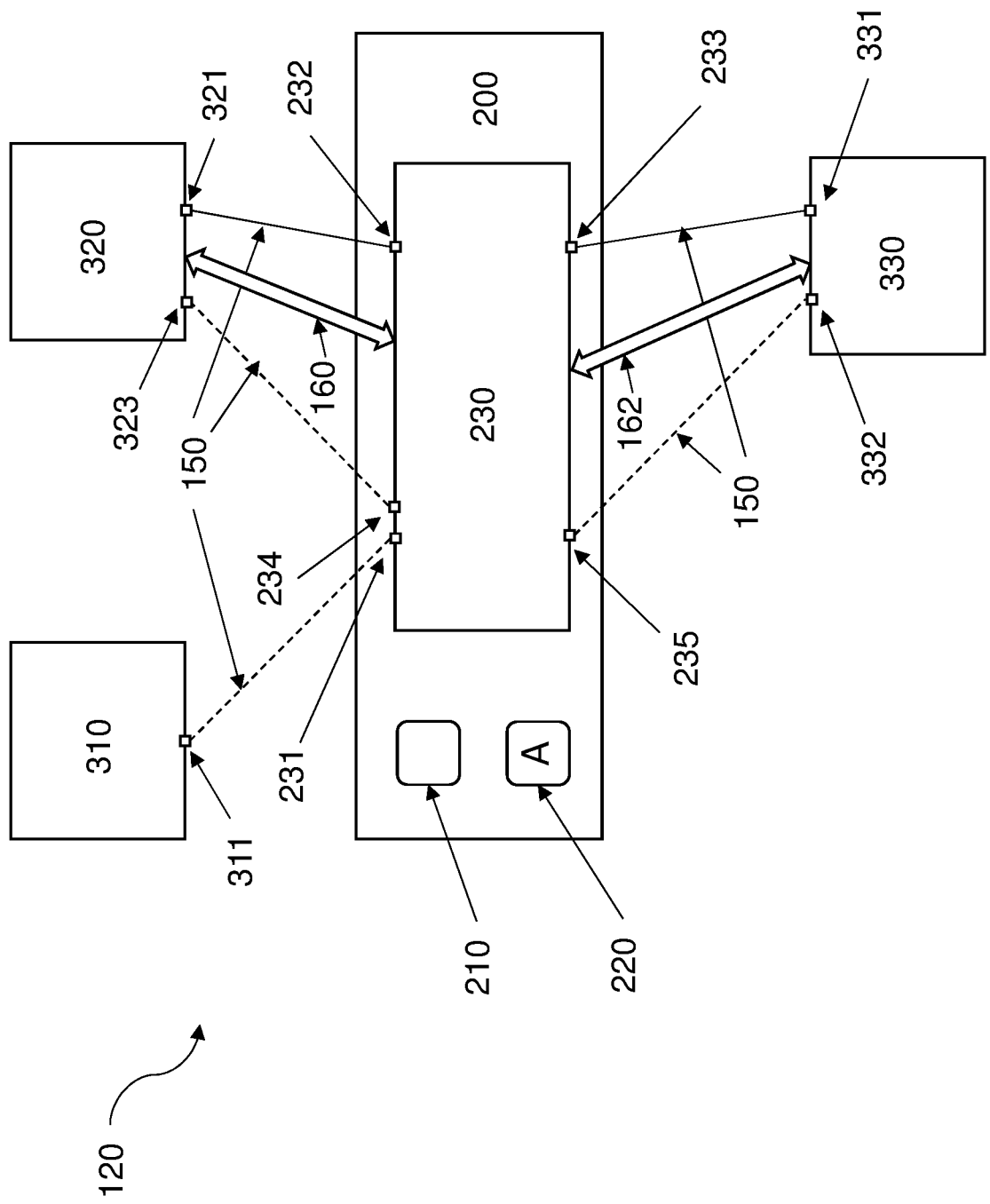

FIG. 7 shows a schematic depiction of the communications network of FIG. 6 in an alternative scenario.

FIG. 8 shows a schematic depiction of two routers both of which comprise management software elements, control plane software elements, data plane software elements and ASICs.

DETAILED DESCRIPTION OF CERTAIN INVENTIVE EMBODIMENTS

Figure 1:
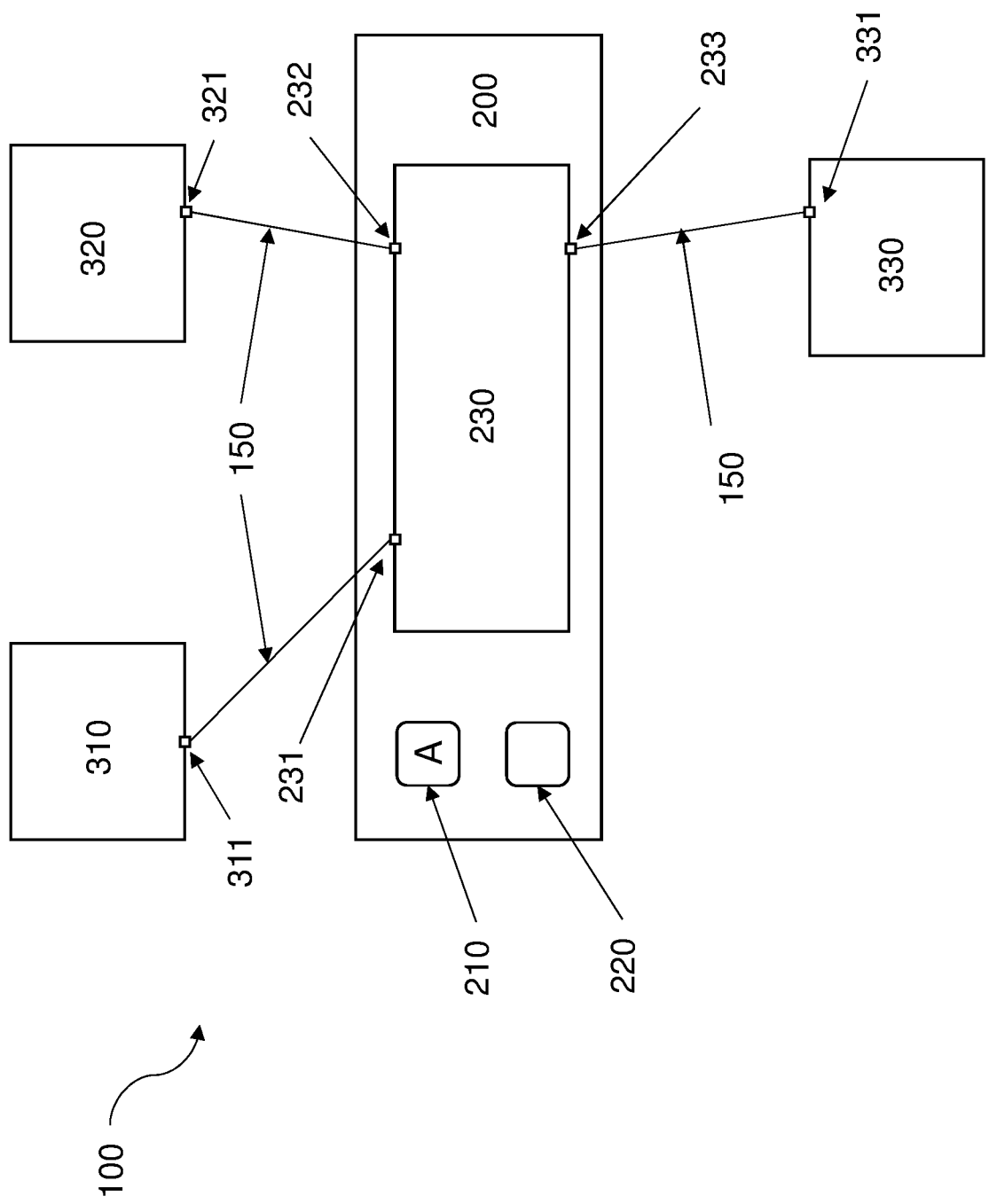
FIG. 1 shows a schematic depiction of a communications network.

FIG. 1 shows a schematic depiction of a communications network 100. The communications network comprises a plurality of routers 200, 310, 320, 330, which are connected by a plurality of links 150. In more detail, the network comprises a high availability router 200 and first, second and third routers 310, 320, 330. The high availability router 200 comprises a primary control plane part 210, a secondary control plane part 220 and a data plane part 230. The control plane parts 210, 220 may include two similar data plane software modules, arranged in an active/standby high availability configuration, executing on two different hardware elements, for example two separate application specific integrated circuits (ASICs). The data plane part may include two similar data plane software modules, arranged in an active/active high availability configuration, each installed on a respective one of the two different hardware elements, such that each respective control plane software module is installed on the same hardware element as one of the data plane software modules.

The data plane part comprises a plurality of network interfaces 231, 232, 233. Each of the first, second and third routers has a respective link 150 to the high availability router. The first router 310 has a network interface 311 which is connected to network interface 231 of the data plane part of the high availability router. Similarly, the second router 320 has a network interface 321 which is connected to network interface 232 of the data plane part of the high availability router and the third router 330 has a network interface 331 which is connected to network interface 233 of the data plane part of the high availability router. It will be understood that the network shown in FIG. 1 will represent a small portion of a network and that the network may comprise more routers and links which are not shown in FIG. 1.

In operation, the network uses the internet protocol to transmit packets and the OSPF protocol is used when routing packets. The primary control plane part of the high availability router may be active (indicated by the letter A in FIG. 1) and will control the routing made within the high availability router and the secondary control plane part will be on standby. Data packets which are to be sent from the first router 310 to the third router 330 will be routed via the high availability router, with the packets being routed from network interface 311 to network interface 231, through the data plane part 230 and then from network interface 233 to network interface 331. Data packets which are to be sent from the third router to the first router will follow the reverse path via the high availability router.

Figure 2:
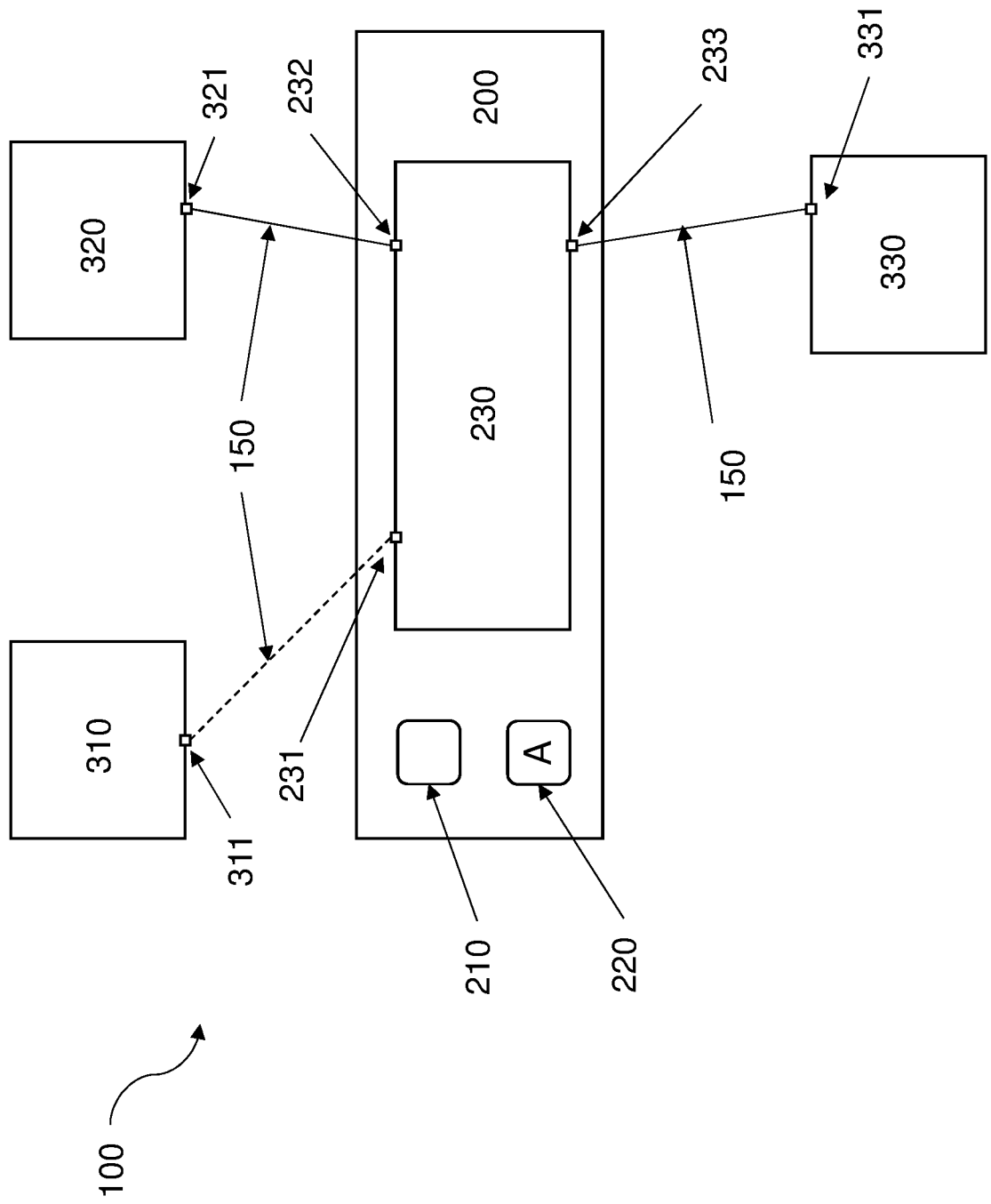
FIG. 2 shows a schematic depiction of the communications network of FIG. 1 in an alternative scenario.
Figure 3:
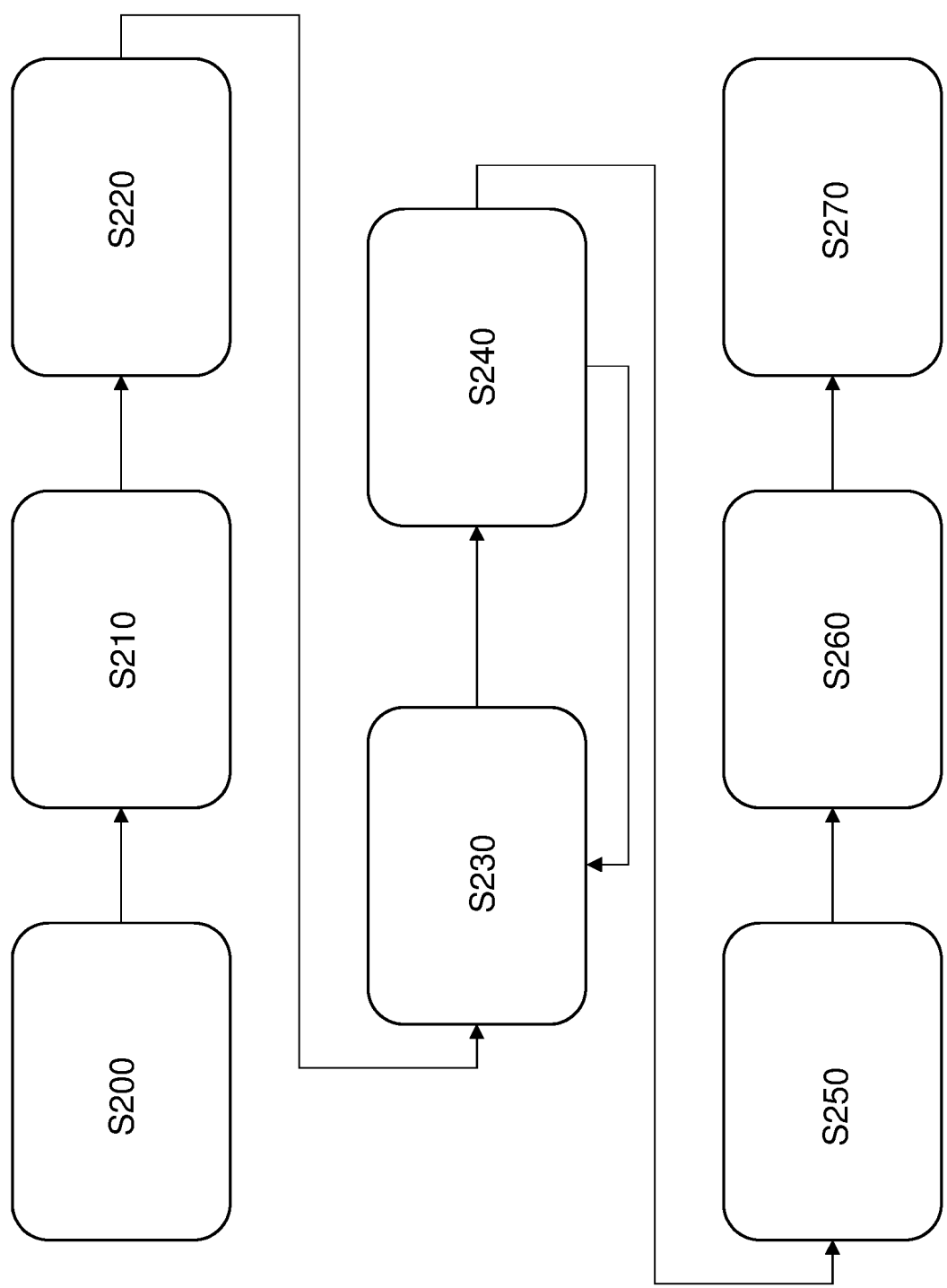
FIG. 3 shows a graphical depiction of the modified graceful restart procedure according to the present invention.

Consider the situation where the primary control plane part and a portion of the data plane part fails. FIG. 2 shows a schematic depiction of the network of FIG. 1 in such a scenario. As can be seen from FIG. 2, the secondary control plane part is now active (as indicated by the letter A in FIG. 2), and the network interface 231 is no longer functioning. As such, the link between the high availability router and the first router 310 is no longer active, with the inactive link being shown by a dashed line. The activation of the secondary control plane part causes the high availability router to enter a modified graceful restart procedure according to an aspect of the present invention, a graphical depiction of which is shown in FIG. 3. In parallel with this process, the high availability router will forward traffic in accordance with the data held in the forwarding plane of the high availability router.

At step S200 the high availability router enters the modified graceful restart procedure and sends grace-LSAs to the neighbouring nodes at S210. At S220, the secondary control plane part will receive acknowledgments from the second and third routers, indicating that they have gone into helper mode. At step S230, the secondary control plane part receives LSAs from the second and third routers. At step 240, the secondary control plane part analyses the received LSAs to determine the links that were active prior to the restart. The secondary control plane part will then determine (step S250) the subset of the links that were active prior to the restart which are currently active.

Prior to the restart three links were active (interface pairs 311:231, 321:232 and 331:233): currently only two of these links are active, namely the links connecting interfaces 321 and 232 and the interfaces 331 and 233. At step S260, the secondary control plane part attempts to establish adjacencies with the helper nodes which are connected by the links which were identified in step S250, that is the second and third routers. Once the adjacencies have been established between the high availability router and the second router and between the high availability router and the third router then the high availability router exits the modified graceful restart procedure at step S270. The secondary control plane part will then flush the grace-LSAs that were transmitted and continue with conventional OSPF operations, sending LSAs to its neighbours and refreshing the routing table.

In an alternative, at step 230, the secondary control plane part may wait to receive LSAs from each of the helper nodes which sent acknowledgements in response to the grace-LSA. Once all of the LSAs have been received then the secondary control plane part may proceed to step S240 such that the links that were active prior to the restart can be identified. Alternatively, as each LSA is received the secondary node may proceed to S240 to analyse the data held in the LSA before returning to step S230 to receive another LSA. Once all of the expected LSAs have been received and analysed then the process will proceed to step S250 as described above.

If the conventional OSPF graceful restart mode was followed then the high availability router could not exit graceful restart until the adjacency with the first router was re-established, in addition to the re-established dependencies with the second and third routers. As there is no active link between the high availability router and the first router then it is not possible for the adjacency with the first mode to be re-established. Thus, the high availability router would only be able to exit graceful restart when the grace time-out period specified in the grace-LSA expired.

The modified graceful restart procedure enables the high availability router to exit graceful restart once the dependencies with the second and third routers have been re-established. This means that the graceful restart period is exited earlier than would be the case with the conventional graceful restart procedure, before the grace time-out period. An advantage of this is that traffic that was being routed to the first router via the high availability router before the restart would be 'black holed', that is the traffic will be dropped by the high availability router without any form of message or signalling to indicate that the traffic is being lost. The modified graceful restart procedure thus reduces the volume of traffic that is lost in this manner due to the earlier exit from graceful restart.

Figure 4:
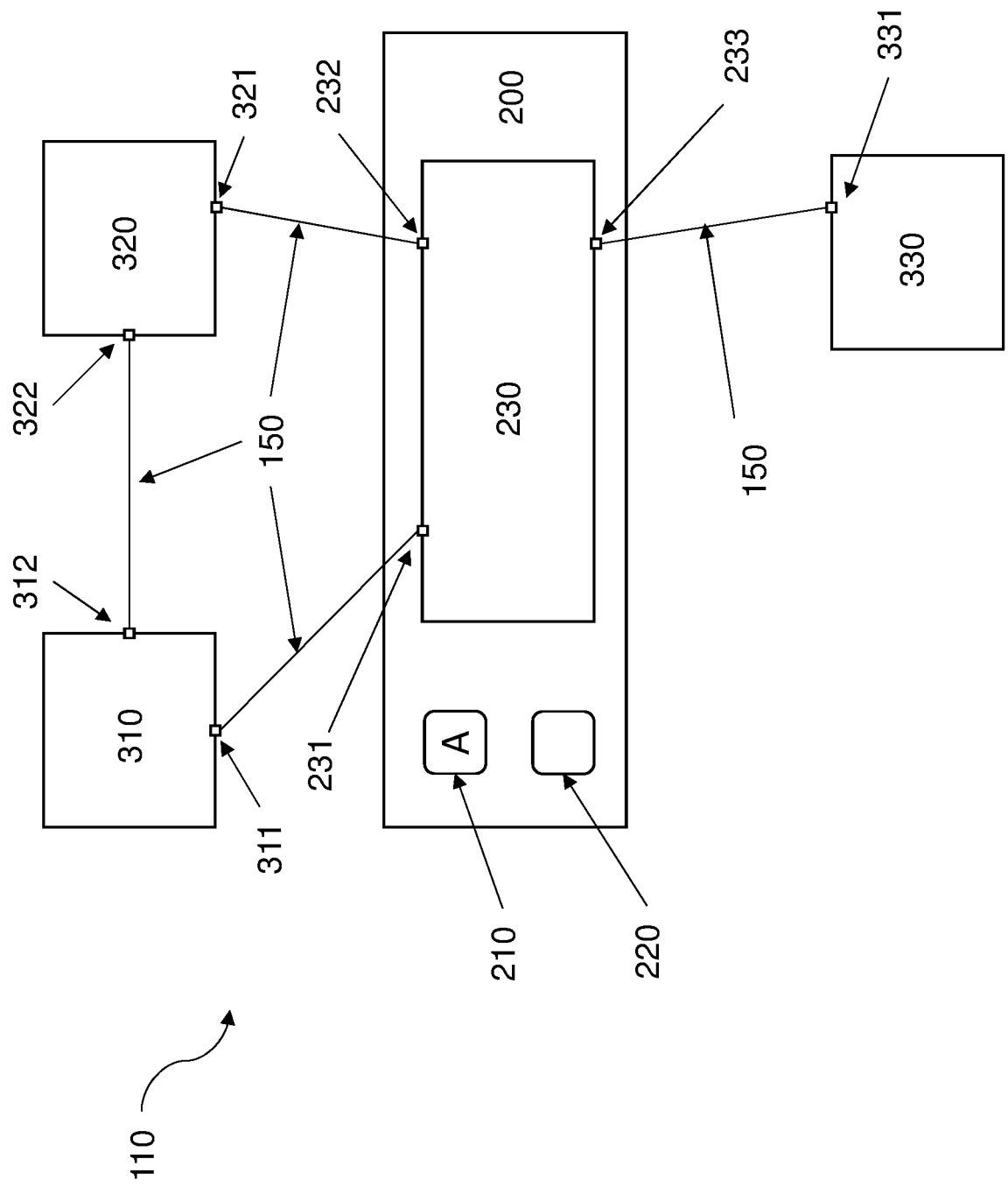
FIG. 4 shows a schematic depiction of a further communications network.

FIG. 4 shows a schematic depiction of a further communications network 110, which is the same as the communications network 100 described above with reference to FIG. 1 except that there is an additional link 150 which connects the first router 310 to the second router 320. The first router comprises an additional network interface 312 and the second router comprises an additional network interface 322 and the additional link connects network interface 312 to network interface 322.

In normal operation the primary control plane part 210 is active within the high availability router is active and the secondary control plane part 220 is on standby. In use, data packets from the first router 310 to the second router 320 will be routed via the new link which connects network interface 312 to network interface 322. Data packets from the first router 310 to the third router 330 are likely to be routed via the high availability router, as this route involves only two hops and is likely to have a lower cost than the route via the second router, the high availability router and then the third router. Traffic between the second router and the third router is likely to be routed via the high availability router for similar reasons.

Figure 5:
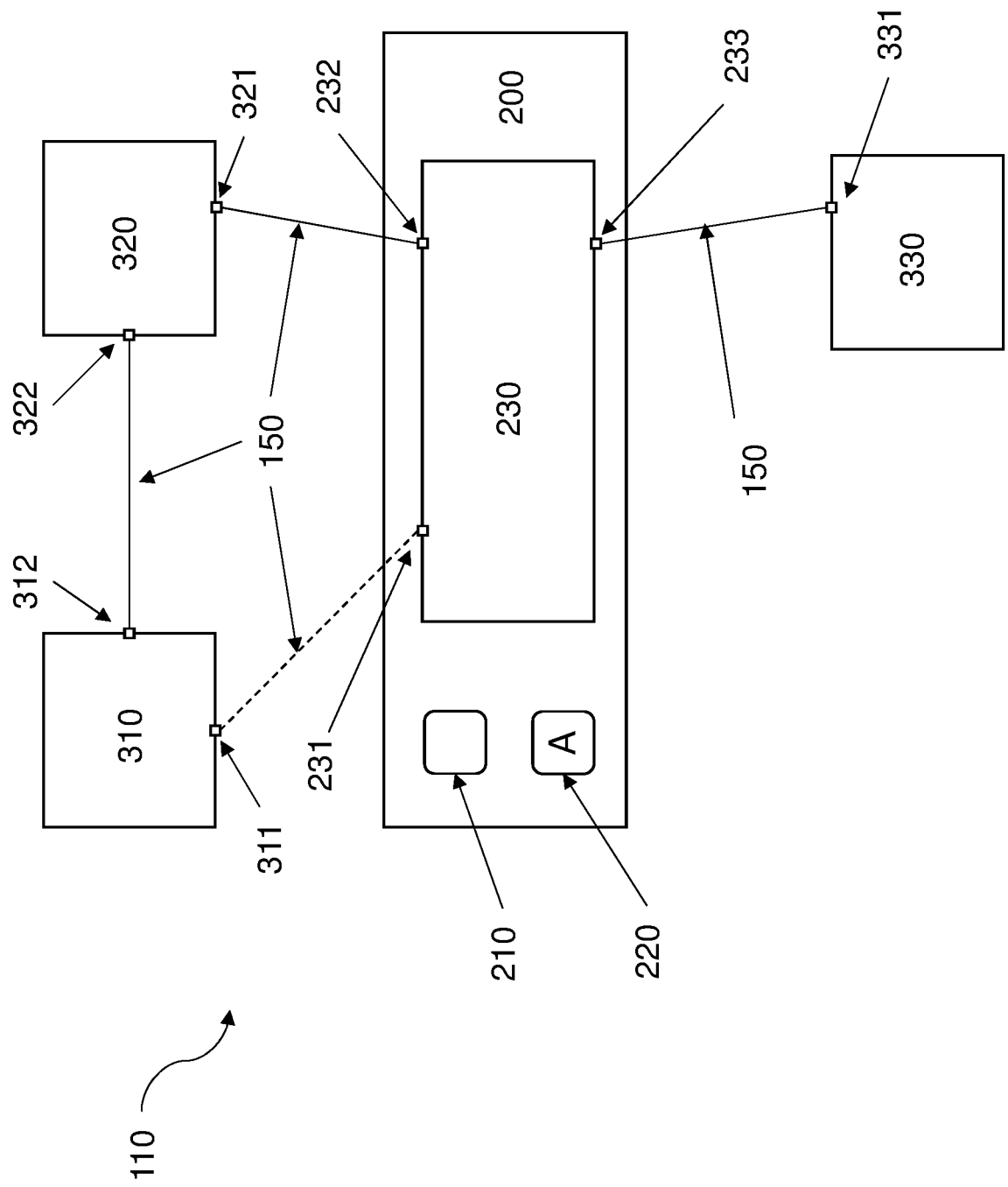
FIG. 5 shows a schematic depiction of the communications network of FIG. 4 in an alternative scenario.

Consider the situation where the primary control plane part of the high availability router and a portion of the data plane part fails. FIG. 5 shows a schematic depiction of the network 110 in such a scenario. The secondary control plane part 220 of the high availability router is now active (shown by the letter A) and the link between the high availability router and the first router is no longer active due to the partial failure of the data plane part. The inactive link is shown in FIG. 5 with a dashed line.

Again, as discussed above the secondary control plane part will route traffic in accordance with the data held in the forwarding plane of the high availability router. The high availability router will enter the modified graceful restart procedure (S200) discussed above with reference to FIG. 2 and will send grace-LSAs (S210) to the neighbouring nodes, that is the second and third nodes. The secondary control plane part will receive the acknowledgments from the second and third nodes (S220), indicating that the second and third routers have entered the helper mode. LSAs will then be received from the second and third routers (S230). At step 240, the secondary control plane part analyses the received LSAs to determine the links that were active prior to the restart. The secondary control plane part will then determine (step S250) the subset of the links that were active prior to the restart which are currently active.

Prior to the restart three links were active (interface pairs 311:231, 321:232 and 331:233): currently only two of these links are active, namely the links connecting interfaces 321 and 232 and the interfaces 331 and 233. At step S260, the secondary control plane part attempts to establish adjacencies with the helper nodes which are connected by the links which were identified in step S250, that is the second and third routers. Once the adjacencies have been established between the high availability router and the second router and between the high availability router and the third router then the high availability router exits the modified graceful restart procedure at step S270. The secondary control plane part will then flush the grace-LSAs that were transmitted and continue with conventional OSPF operations, sending LSAs to its neighbours and refreshing the routing table.

If the conventional graceful restart procedure had been followed then the first node 310 would report the loss of its link to the primary router, that is the link between network interface 311 and network interface 231, by sending an LSA. This LSA would be sent to the high availability router, via the second node 320, which would then cause the high availability router to exit graceful restart because it would detect an inconsistency between the new LSA and the pre-restart state. A consequence of this is that this would lead to the network routes being recalculated, leading to potential black holing of traffic whilst network routes are being restored.

The modified graceful restart method according to the present disclosure allows the secondary control plane part to continue the graceful restart as the high availability router will ignore the inconsistency highlighted by the LSA sent by the first router which reported the change in network configuration caused by the lost connection to the high availability router. By continuing the graceful restart, traffic can be forwarded by the high availability router to the second and third routers such that only traffic routed to the first router will be 'black holed'. Once the graceful restart mode is exited then alternative routings to the first router can be made.

FIG. 6 shows a schematic depiction of a further communications network 120, which is similar to the communications network 100 described above with reference to FIG. 1. The data plane part 230 of the high availability router 200 further comprises network interfaces 234 and 235. The second router comprises a further network interface 323 and the third router comprises a further network interface 332. There is a second link between the data plane part and the second router, which connects network interface 234 and network interface 323. Similarly, there is a second link between the data plane part and the third router, which connects network interface 235 and network interface 332.

In operation, the network uses the internet protocol to transmit packets and the OSPF protocol is used when routing packets. The primary control plane part of the high availability router will be active (indicated by the letter A in FIG. 6) and will control the routing made within the high availability router, whilst the secondary control plane part is on standby. Both the second and the third routers have two links to the high availability router. It is possible for these links to be configured as link aggregation groups (LAGs) to provide a first connection 160 between the second router and the high availability router and a second connection 162 between the third router and the high availability router respectively. When OSPF is used to route data in the network the traffic routed between the third router and the second router will be routed via the second connection 162, the high availability router and the first connection 160. The links can be thought of as operating at level 2 of the OSI model and the connections can be thought of as operating at level 3 of the OSI model.

Consider the situation where the primary control plane part of the high availability router and a portion of the data plane part fails. FIG. 7 shows a schematic depiction of the network 120 in such a scenario. The secondary control plane part 220 of the high availability router is now active (shown by the letter A). The partial failure of the data plane part has caused the links connected to network interfaces 231, 234 & 235 to become inactive (FIG. 7 shows the inactive links with a dashed line). Thus, the high availability router has lost its link to the first router, the first connection 160 is carried over a single link (the link connecting network interfaces 232 and 321) and the second connection 162 is also carried over a single link (the link connecting network interface 233 and 331).

The high availability router will enter the modified graceful restart procedure (see FIG. 3) and in parallel with this process, the high availability router will forward traffic in accordance with the data held in the forwarding plane of the high availability router. At step S200 the high availability router enters the modified graceful restart procedure and sends grace-LSAs to the neighbouring nodes at S210. At S220, the secondary control plane part will receive acknowledgments from the second and third routers, indicating that they have gone into helper mode. At step S230, the secondary control plane part receives LSAs from the second and third routers. At step 240, the secondary control plane part analyses the received LSAs to determine the links that were active prior to the restart. The secondary control plane part will then determine (step S250) the subset of the links that were active prior to the restart which are currently active. The only links that were active prior to the restart which are currently active are the link from network interface 232 to 321 and the link from network interface 233 to 331 (which support connections 160 and 162 respectively). The other links that were active prior to the restart are all now inactive. At step S260, the secondary control plane part attempts to establish adjacencies with the helper nodes which are connected by the links which were identified in step S250, that is the second and third routers. Once the adjacencies have been established between the high availability router and the second router and between the high availability router and the third router then the high availability router exits the modified graceful restart procedure at step S270. The secondary control plane part will then flush the grace-LSAs that were transmitted and continue with conventional OSPF operations, sending LSAs to its neighbours and refreshing the routing table.

The modified graceful restart procedure enables the high availability router to exit graceful restart once the dependencies with the second and third routers have been re-established. This means that the graceful restart period is exited earlier than would be the case with the conventional graceful restart procedure, as in the conventional graceful restart procedure the high availability router would be waiting to receive an LSA from the first router and could only exit graceful restart when the grace period expired. As discussed above, the use of the modified graceful restart method according to the present invention reduces the amount of traffic that is lost into a 'black hole' by providing an earlier exit from graceful restart, prior to the expiry of a grace time-out period.

In the preceding discussion, the loss of the primary control plane part occurs with a partial loss of the data plane part. It should be understood that a partial loss of the data plane part is just one example of an unplanned change to the network configuration and that the modified graceful restart method of the present invention is applicable to other unplanned network configuration changes, for example, the failure of a cable which carries a link, the failure of a transceiver, etc.

FIG. 8 shows a schematic depiction of two routers 800A, 800B, both of which comprise management software elements 810, control plane software elements 820, data plane software elements 830 and ASICs 840. The similar elements in the routers have cross-connects and can be configured such that if the active control plane were to fail, the standby control panel can be activated. The data planes can be run in an active-active arrangement such that the active control plane controls both active data planes.

The above embodiments are to be understood as illustrative examples of the invention. Further embodiments of the invention are envisaged. In the preceding discussion, the modified graceful restart method is exited when adjacencies are re-established over all of the links that were active prior to the restart which are currently active. In an alternative, the modified graceful restart method may be exited earlier, for example when adjacencies are re-established over only a subset of these links.

Expressed in a general form, the modified graceful restart method provided by the present invention allows a restarting router to classify its links as either being unavailable, restored for use or unknown (as the router is still waiting for an adjacency to be re-established over the link). As the graceful restart procedure is carried out, links will be move from the 'unknown' classification to the 'restored' classification. While the restating router may exit graceful restart when all of the 'unknown' links are classified as being 'restored', it should be appreciated that traffic being routed to the 'unavailable' links is being 'black holed' while the graceful restart is being carried out. Thus, there may be a benefit in exiting graceful restart early, before all of the 'unknown' links can be restored to reduce the amount of traffic being lost. The threshold, or thresholds, used to determine the point at which the restating router exits graceful restart may be based on the volume of traffic associated with the links classified as unavailable, restored or unknown, and/or a value or priority associated with the of traffic associated with the links classified as unavailable, restored or unknown.

If the restarting router routes traffic over one or more links which are classified as high priority then if these high priority links are not available to the restarting router due to changes in the network topology caused by some sort of failure then the router may decide to terminate the graceful restart such that the failure can be routed around by the neighbouring nodes. If the high priority links are available to the re-starting router then the graceful restart will be proceeded with as normal such that there is uninterrupted forwarding of traffic over the high priority links. A link may be classified as being a high priority link if the traffic carried on the link exceeds a predetermined threshold value, if it carries a predetermined portion of the traffic routed by a router, or on some other basis. The usage of a link may be the basis for the classification of a link as being high priority, such that if the usage of a link exceeds a predetermined threshold then the graceful restart will be terminated if that link is not available to the restarting router. The graceful restart method may be proceeded with if only links with low usage, that is below a threshold value, are not available to the router, or the total usage of the unavailable links is less than a threshold value The classification of a link as high priority may be automatic, derived from statistics held in a network management system.

It should be understood that a conventional router can be modified to perform the modified graceful restart method according to the present invention by the incorporation of appropriate computer code. Such computer code may be accessed via download, for example via a software update accessed from a server computer, or on some physical media, for example, DVD, CD-ROM, USB memory stick, etc. for which the router has an appropriate media reader. A router may be configured such that it is capable of performing the conventional graceful restart method or the modified graceful restart method according to the present invention. A network operator may configure one or more routers in a network to operate in accordance with the modified graceful restart method of the present invention. The preceding discussion of the invention has been within the context of packet routing using OSPF but it will be understood that the present invention could be used with other similar routing protocols, such as, for example, BGP, ISIS, RIP, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A network node for use in a communications network, the network node comprising a processor and memory, the memory storing thereon computer-executable instructions that, when executed by the processor, cause the network to perform operations comprising:
in response to initiating a graceful restart mode:
sending a graceful restart notification to one or more neighboring nodes;
attempting to re-establish an adjacency with each of the one or more neighboring nodes;
receiving link state data from at least one of the one or more neighboring nodes, the link state data being sent in response to the attempt to re-establish an adjacency,
deriving pre-restart link data from the received link state data, the pre-restart link state data identifying a plurality of formerly active links for routing traffic before the restart, the formerly active links including the network node;
routing network traffic in accordance with routing information stored in the network node;
detecting one or more links, of the formerly active links, which are currently inactive;
continuing with graceful restart after the detection of one or more links, of the formerly active links, which are currently inactive; and
determining one or more links, of the formerly active links, which are currently active; and
exiting the graceful restart mode in response to successful re-establishment of adjacencies with a respective neighboring node for each of the one or more links which are currently active.

2. The network node of claim 1, wherein the network node is arranged to directly detect one or more of said currently inactive links, without receiving link state update data from one or more neighboring nodes relating to said currently inactive links.

3. The network node of claim 1, wherein the network node is arranged to indirectly detect one or more of said currently inactive links, by receiving link state update data from one or more neighboring nodes relating to said currently inactive links.

4. The network node of claim 1, wherein the network node is arranged to exit the graceful restart mode if the adjacencies with the respective node for each of the one or more links which are currently active are not re-established within a predetermined time-out period.

5. The network node of claim 1, wherein the network node is arranged to:
detect one or more high priority links of the formerly active links, which are currently inactive; and
exit the graceful restart mode in response to the detection of the one or more high priority links, of the formerly active links, which are currently inactive.

6. The network node of claim 5, wherein the one or more high priority links are classified as high priority in accordance with the traffic carried by the one or more links before the restart.

7. The network node of claim 6, wherein the one or more high priority links are classified as high priority if the traffic carried by the links before the restart exceeds a pre-determined threshold value.

8. The network node of claim 1, wherein the network node is arranged to exit the graceful restart mode in response to the detection of one or more links, of the formerly active links, which are currently inactive, wherein a decision to exit the graceful restart mode is made in accordance with the number of currently inactive links.

9. The network node of claim 1, wherein the network node is arranged to
exit the graceful restart mode in response to the detection of one or more links, of the formerly active links, which are currently inactive, wherein a decision to exit the graceful restart mode being is made in accordance with the traffic carried by the currently inactive links before the restart.

10. The network node of claim 1, where the Open Shortest Path First (OSPF) routing protocol is used to route data.

11. The network node of claim 1, the network node having a first graceful restart mode and a second graceful restart mode, wherein:
the network node is configurable to perform graceful restart according to the first graceful restart mode or the second graceful restart mode;
the network node, when configured in the first graceful restart mode, is configured to perform the steps of claim 1; and
the network node, when configured in the second graceful restart mode, is configured to perform the steps of:
attempting to re-establish an adjacency with each of one or more neighboring nodes;
receiving pre-restart link state data from at least one of the one or more neighboring nodes, the pre-restart link state data being sent in response to the attempt to re-establish an adjacency, the pre-restart link state data identifying a plurality of formerly active links via which traffic was routed before the restart, the formerly active links including the network node;
storing routing information based upon the received pre-restart link state data;
routing network traffic in accordance with the routing information;
detecting one or more links, of the formerly active links, which are currently inactive; and
exiting the graceful restart mode in response to the detection of one or more links, of the formerly active links, which are currently inactive.

12. The network node of claim 1, wherein the network node is communicatively coupled to a communications network comprising a plurality of additional network nodes, the plurality of additional network nodes being connected by a plurality of links.

13. A method performed by a network node, the network node having a graceful restart mode, the method comprising:
in response to initiating a graceful restart mode:
sending a graceful restart notification to one or more neighboring nodes;
re-establishing an adjacency with each of the one or more neighboring nodes;
receiving link state data from at least one of the one or more neighbouring neighboring nodes, the link state data being sent in response to an attempt to re-establish an adjacency,
deriving pre-restart link data from the received link state data, the pre-restart link state data identifying a plurality of formerly active links for routing traffic before the restart, the formerly active links including the network node;

routing network traffic in accordance with routing information stored in the network node;

detecting one or more links, of the formerly active links, which are currently inactive;

continuing with graceful restart after the detection of one or more links, of the formerly active links, which are currently inactive; and determining one or more links, of the formerly active links, which are currently active; and exiting the graceful restart mode in response to successful re-establishment of adjacencies with a respective neighboring node for each of the one or more links which are currently active.

14. The method of claim 13, wherein the one or more of currently inactive links are detected directly, without receiving link state update data from one or more neighboring nodes relating to said currently inactive links.

15. The method of claim 13, wherein the one or more currently inactive links are detected indirectly, by receiving link state update data from one or more neighboring nodes relating to said currently inactive links.

16. The method of claim 13, wherein the network node is arranged to exit the graceful restart mode if the adjacencies with the neighboring node for each of the one or more links which are currently active are not re-established within a predetermined time-out period.

17. The method of claim 13, wherein the network node is configured to:

detect one or more high priority links of the formerly active links, which are currently inactive; and exit the graceful restart mode in response to the detection of the one or more high priority links, of the formerly active links, which are currently inactive.

18. The method of claim 13, wherein the network node, is configured to:

exit the graceful restart mode in response to the detection of one or more links, of the formerly active links, which are currently inactive, wherein a decision to exit the graceful restart mode is made in accordance with the traffic carried by the currently inactive links before the restart.

19. The method of claim 13, the network node having a first graceful restart mode and a second graceful restart mode, wherein:

the network node is configurable to perform graceful restart according to the first graceful restart mode or the second graceful restart mode;

the network node, when configured in the first graceful restart mode, is configured to perform the method of claim 13; and the network node, when configured in the second graceful restart mode, is configured to:

attempt to re-establish an adjacency with each of the one or more neighboring nodes;

receive pre-restart link state data from at least one of the one or more neighboring nodes, the pre-restart link state data being sent in response to attempt to re-establish an adjacency, the pre-restart link state data identifying a plurality of formerly active links via which traffic was routed before the restart, the formerly active links including the network node;

store routing information based upon the received pre-restart link state data;

route network traffic in accordance with the routing information;

detect one or more links, of the formerly active links, which are currently inactive; and exit the graceful restart mode in response to the detection of one or more links, of the formerly active links, which are currently inactive.

20. A non-transitory computer storage medium comprising computer executable code that, when executed by a processor of a device, cause the device to perform operations comprising:

in response to initiating a graceful restart mode:

sending a graceful restart notification to one or more neighboring nodes;

re-establishing an adjacency with each of the one or more neighboring nodes;

receiving link state data from at least one of the one or more neighboring nodes, the link state data being sent in response to an attempt to re-establish an adjacency, deriving pre-restart link data from the received link state data, the pre-restart link state data identifying a plurality of formerly active links for routing traffic before the restart, the formerly active links including the device;

routing network traffic in accordance with routing information stored in the device;

detecting one or more links, of the formerly active links, which are currently inactive;

continuing with graceful restart after the detection of one or more links, of the formerly active links, which are currently inactive; and determining one or more links, of the formerly active links, which are currently active; and exiting the graceful restart mode in response to successful re-establishment of adjacencies with a respective neighboring node for each of the one or more links which are currently active.

* * * * *

UNITED STATES PATENT AND TRADEMARK OFFICE
CERTIFICATE OF CORRECTION

| | | |
|---|---|---|
| PATENT NO. | : 11,258,695 B2 | Page 1 of 1 |
| APPLICATION NO. | : 16/803679 | |
| DATED | : February 22, 2022 | |
| INVENTOR(S) | : Davey et al. | |

It is certified that error appears in the above-identified patent and that said Letters Patent is hereby corrected as shown below:

In the Claims (Claim 1) Column 11, Lines 12-13, delete:
"cause the network to perform operations comprising:"
And insert:
--cause the network node to perform operations comprising:--

Signed and Sealed this
Twelfth Day of July, 2022

Katherine Kelly Vidal
*Director of the United States Patent and Trademark Office*